June 10, 1952 — J. M. PESTARINI — 2,599,936

METADYNE MOTOR

Filed Nov. 4, 1946

INVENTOR
Joseph M. Pestarini
BY Philip G. Hilbert
ATTORNEY

Patented June 10, 1952

2,599,936

UNITED STATES PATENT OFFICE 2,599,936

METADYNE MOTOR

Joseph Maximus Pestarini, Staten Island, N. Y.

Application November 4, 1946, Serial No. 707,698

6 Claims. (Cl. 318—319)

This invention relates to improvements in an electric motor of the metadyne type described in Patent No. 1,945,447.

In Patent No. 1,945,447, there is described a dynamoelectric machine of the motor metadyne type having a torque-speed curve which has a sloped characteristic. An object of this invention is to provide an improved motor metadyne which exhibits a torque-speed curve having a sharper slope than that previously known, such slope approaching the perpendicular substantially at the operational speed of the motor metadyne.

The speed at which the torque of a motor metadyne becomes zero, is known as the no-load speed. Accordingly, another object of the invention is to provide improved means for arbitrarily setting the value of the no-load speed.

A further object of the invention is to provide means for reducing the copper losses in the stator windings of a motor metadyne and improved means for controlling the operational characteristics of said motor metadyne.

Figure 1:
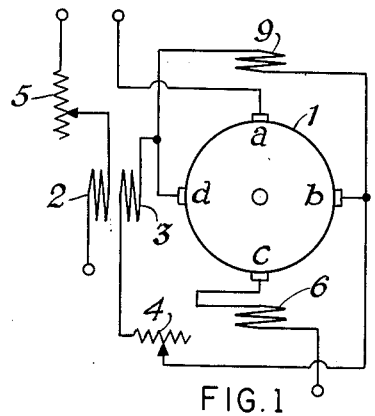
Figures 2, 3:
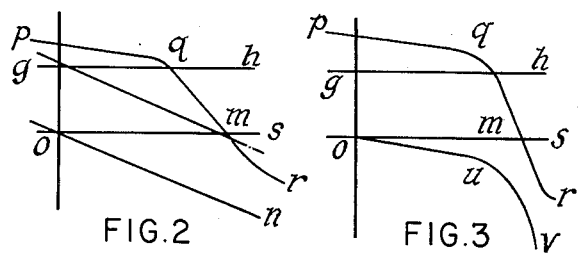
Figure 5:
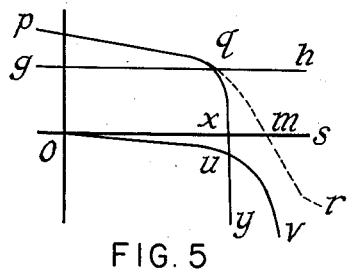
Figure 4:
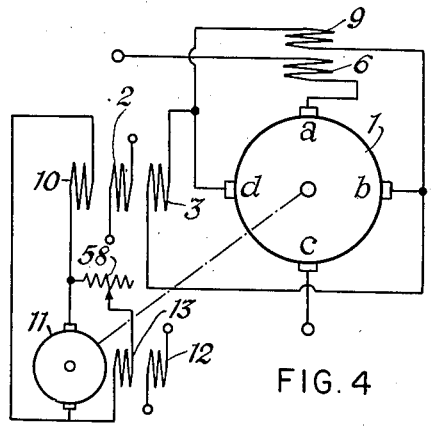
Figure 6:
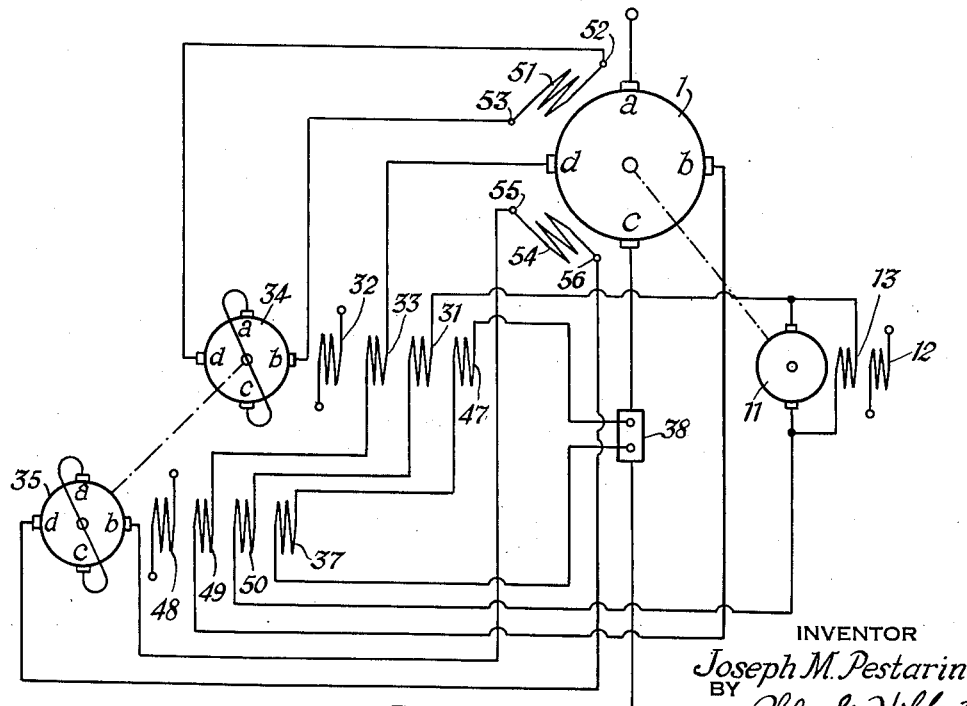

Fig. 1 shows a schematic diagram of a dynamoelectric machine of the motor metadyne type embodying the invention; Fig. 2 and Fig. 3 show performance curves of the motor embodying the invention; Fig. 4 shows the schematic connections of a motor and an auxiliary dynamo; Fig. 5 shows the performance curves of the system shown in Fig. 4, and Fig. 6 shows a schematic diagram for a system including a motor metadyne and a pair of dynamoelectric machines for controlling the operation thereof.

A dynamoelectric machine of the metadyne type is a rotating electric machine having more than two brushes per cycle, the flux created by the current traversing the armature through a pair of brushes inducing an electromotive force between the brushes of another pair of the same cycle. The number of cycles of an electric machine is defined as the number of times that an observer, accomplishing a complete revolution along the air gap, sees all electrical and magnetic parts repeated in the same disposition.

The metadyne has been described in Patents Nos. 2,055,240, 1,987,417, 2,039,380, 2,049,389 and 2,079,465. A more complete description has been given in Revue Generale de L'Electricite, on March 8th and 15th, August 16th and 23rd, November 22nd and 29th and December 6th, 1930, Paris.

In Figure 1, is shown a motor metadyne 1 embodying the invention. The same comprises an armature having four equidistant brushes, $a$, $b$, $c$ and $d$. The primary brushes $a$, $c$, are connected to a source supplying electric energy, preferably at constant current, not shown. The secondary brushes $b$, $d$ energize a stator winding 3 through a regulating resistor 4. The stator winding 3 has its magnetic axis coinciding with the commutating axis of the secondary brushes $b$, $d$, and when traversed by the current supplied by the secondary brushes, creates ampere turns opposite in direction to the secondary armature ampere turns. The winding 3 has sufficient turns to provide a flux which is greater than that produced by the armature secondary current and accordingly there is a resultant flux in the path of the commutating axis of the secondary brushes and in opposition to the secondary armature ampere turns. In contrast to windings which provide exact neutralization of the armature reaction and therefore 100% compensation, since there is no resultant flux, winding 3 is effective to over-compensate the armature reaction and may be therefore referred to as a hyper-compensating winding. Further, the motor metadyne is provided with another stator winding 2, which may be referred to as a secondary variator winding, having its magnetic axis along the commutating axis of the secondary brushes. The winding 2 is energized by a constant voltage source, not shown. The regulating rheostat 5 in circuit with winding 2 creates a predetermined value of ampere turns. At this point the device takes the form of the motor metadyne described in Patent No. 1,945,447.

When the primary brushes $a$, $c$ are traversed by current, having a constant intensity, the armature ampere turns create a flux which induces, proportional to the speed, an electromotive force between the secondary brushes. Therefore, the ampere turns created by the current traversing the armature through its secondary brushes and the winding 3, may be represented in the diagram of Figure 2 by the straight line $on$, the speed S being represented as the abscissa, the ordinates representing ampere turns. If the ampere turns of the secondary variator winding 2 are represented by the straight line $gh$, the straight line $gm$ will represent the resultant ampere turns in the direction of the secondary commutating axis and if the iron is conveniently saturated in the direction of the secondary commutating axis, the secondary flux and therefore the torque of the motor as well, will be represented by line $pqmr$ showing a slope with an obtuse angle at the point $q$ where saturation ends. The abscissa at point $m$ is the nil-torque speed.

By modifying the resistance of the rheostat 4, the point m of the nil-torque speed is shifted along the abscissa axis. By modifying the resistance of the rheostat 5, the starting torque, indicated by the ordinate at the point p is modified. Thus the setting of rheostats 4 and 5 provides a group of characteristic curves of a pattern similar to that of the characteristic curve pqmr.

According to this invention, the motor metadyne is further provided with a stator winding in series with brush c. The winding 6 is traversed by the primary current and creates a flux in the path of the primary armature ampere turns generally in the same direction, in which case the winding has an amplifying action. Such winding increases the primary flux, and thus increases the voltage induced between the secondary brushes b, d at a given speed of the motor 1.

In addition to the winding 6, there is provided a winding 9 shunt connected across the brushes b, d. Winding 9 has its magnetic axis coinciding with the commutating axis of the primary brushes a, c. Assume that the direction of the flux created by the winding 6 is in the same direction as the flux created by the primary armature ampere turns. Then the primary flux will be increased and an increased voltage will be induced between the secondary brushes b, d, at a given speed of motor 1. Accordingly, the winding 6 displays amplifying characteristics and may be referred to as an amplifying winding. Thus, the curve on indicated in Fig. 2 will assume an increased inclination with respect to the horizontal and therefore, the portion qm of the curve pqmr will more nearly approach the vertical.

The winding 9 is adapted to modify the action of winding 3 to further increase the primary flux in a manner to cause the curve representing the created ampere turns to gradually decrease with an increase in the speed of motor 1 to a point u on the curve ouv, as indicated in Fig. 3. With a further increase in speed, the decrease of ampere turns is sharply accelerated, as indicated by the portion uv of the curve ouv. Accordingly, the inclination of the portion qm of the curve pqmr, is further increased to more nearly approach the vertical, as shown in Fig. 3.

In cooperation with winding 9, winding 6 may operate as a partial compensating winding. Winding 6 may have sufficient turns so as to create a flux in opposition to, and of a magnitude always less than, the flux of the primary armature ampere turns. Accordingly there will be a resultant flux in the path of the commutating axis of the primary brushes. Here again, there is but partial compensation of the primary armature reaction and since winding 6 provides a flux less than that of the primary armature current, such winding may be referred to as a hypo-compensating winding. As a result, the portion ou of the curve ouv more nearly approaches the horizontal and correspondingly, the portion pq of curve pqmr also more nearly approaches the horizontal.

Figure 4 shows an arrangement, according to the invention, for obtaining a very sharp slope of the characteristic curve pqr at the point q. In this figure, in addition to stator windings 2, 3, 6, 9, shown in Figure 1, there is further provided a winding 10, traversed by the current supplied by an auxiliary dynamo 11. The dynamo 11, referred to as a regulator dynamo, is coupled to the motor metadyne and is provided with a shunt excitation field winding 13. The building up speed of the dynamo 11 is regulated at the desired nil-torque speed by adjusting a rheostat 58 in series with winding 13. At the neighborhood of that speed, the current supplied by the regulator dynamo builds up and increases very quickly, and in traversing the regulator winding 10, it creates ampere turns in the opposite direction to that of the ampere turns created by the secondary variator winding 2. The result is a very sharp slope of the torque-speed characteristic. The dynamo 11 is further provided with a field winding 12, excited by an independent source of current, not shown, for creating a small number of constant ampere turns which biases the direction of the current supplied by the regulator dynamo 11 at its building up speed.

The value of the building up speed of the regulator dynamo 11 and therefore, the value of the nil-torque speed of the motor metadyne is regulated by the resistance of the rheostat 58 modifying the resistance of the field excitation winding 13.

In many applications, a frequent variation of the nil-torque speed is required. The ceiling safety speed is obtained by the action of the primary hypo-compensator winding 6, combined with the action of the shunt connected primary variator winding 9, as previously described in connection with Figure 1. The varying nil-torque speed is obtained by the regulation of the rheostat 58. Figure 5 shows the thus obtained characteristic. The line pqmr corresponds to the action of the primary hypo-compensator winding 6, combined with the primary variator winding 9. The ceiling nil-torque speed is given by the abscissa at the point m. The curve pqxy is the torque-speed characteristic for a given setting of the rheostat 58. The operational nil-torque speed is the abscissa at the point x. The point x may be easily shifted along the abscissa axis while the point m remains constant as a safety ceiling speed. The curve ouv corresponds to the similar curve shown in Figure 3.

In Figure 4, the regulator dynamo 11 is shown as a shunt excited dynamo. It is understood that in lieu thereof, a series excited dynamo may be used.

The dynamo 11 may be connected to an independent source of direct current at constant voltage, through the regulator winding 10. In this case no biasing excitation field winding is necessary.

While the stator winding 2 has been described as being energized with a constant voltage, it is understood that the winding may be energized by other means, as for example by a variable voltage source such as an auxiliary dynamo having a magnetic circuit which saturates at a given speed of the motor 1 with which the dynamo is associated.

In another form of this invention all the stator windings of the motor metadyne having the same magnetic axis may be replaced by a single winding. Said single winding is energized by an amplifier metadyne which creates in the winding, the same resultant ampere turns which were created by the combination of the original windings.

The stator windings of motor 1, as shown in Fig. 4, may be combined in the form of a pair of windings, each of which may be energized in a manner to create the resultant effects of the individual windings. Accordingly, as shown in Fig. 6, the motor 1 is provided with stator windings 51, 54. The winding 51 is adapted to produce the resultant effects of windings 2, 3, 6, 9 and 10 in the direction of its magnetic axis while the winding 54 is adapted to produce the resultant effects of windings 2, 3, 6, 9 and 10, in the direction of its magnetic axis. As shown in Fig. 6, winding 51 is displaced 90 electrical degrees from winding 54.

Winding 51 is energized through its terminals 52, 53 by a dynamoelectric machine 34 of the amplifier metadyne type. Machine 34 comprises an armature provided a commutator having a pair of short circuited primary brushes *a, c* and a pair of secondary brushes *b, d*, displaced from the brushes *a, c*. The brushes *b, d* are connected across the terminals 52, 53 of winding 51. The machine 34 further comprises controlling stator windings 31, 32, 33 and 47. Winding 47 is connected to a shunt 38 inserted in the primary brush circuit of motor 1, thus creating ampere turns proportional to the primary current of the motor. Winding 31 is connected across the terminals of a regulator dynamo 11 which is coupled to motor 1 and is controlled by windings 12, 13, as described in connection with Fig. 4. Accordingly, winding 31 creates ampere turns proportional to the current of dynamo 11.

Winding 33 is connected across the secondary brushes *b, d* of motor 1 and therefore creates ampere turns proportional to the voltage induced between the brushes *b, d* of the motor 1 and corresponds in action to windings 3, 9 of Fig. 4. Winding 32 is independently energized and is adapted to create the same effect as winding 2, as shown in Fig. 4.

Winding 54 is energized through its terminals 55, 56 by a dynamoelectric machine 35 which is similar to machine 34. The machine 35 is controlled by windings 48, 49, 50 and 37 which operate in the manner of corresponding windings 32, 33, 31 and 47, respectively. To this end winding 37 is connected in series with winding 47; winding 50 is connected in series with winding 31; winding 49 is connected in series with winding 33 and winding 48 is independently energized.

It is understood that the effect of windings 6, 9 may be partially obtained by replacing the same with an independently energized winding having the same magnetic axis as windings 6, 9.

I claim:

1. An electric direct current power system comprising a variable speed motor having an armature associated with a pair of primary brushes and a pair of secondary brushes displaced therefrom and a plurality of stator windings, said primary brushes being adapted to be energized with a constant current, one of said windings with its magnetic axis coincident with the secondary commutating axis being connected to said secondary brushes and having sufficient turns for creating a flux greater than and in opposition to the flux created by the secondary armature current, another winding being adapted to be independently energized and to create a predetermined flux in the path of said second mentioned flux, and a further winding having sufficient turns for creating a flux in the path of the flux created by the primary armature current and having a magnitude whereby a resultant flux is provided in the last mentioned path and in the same direction as the flux created by the primary armature current.

2. A power system as in claim 1, wherein said last mentioned stator winding is series connected with the primary brushes of said motor and has its magnetic axis coincident with the magnetic axis of the flux created by the current traversing the armature through the primary brushes.

3. A power system as in claim 1, wherein said last mentioned stator winding is shunt connected across the secondary brushes of said motor and has its magnetic axis coincident with the magnetic axis of the flux created by the current traversing the armature through the primary brushes.

4. A power system as in claim 2, wherein another winding has its magnetic axis coincident with the magnetic axis of the flux created by the current traversing the armature through the primary brushes, and is shunt connected across the secondary brushes of said motor.

5. A power system as in claim 1, wherein said last mentioned stator winding has its magnetic axis coincident with the magnetic axis of the flux created by the current traversing said armature through its secondary brushes and further including dynamo means responsive to the speed of said motor for energizing said last mentioned stator winding with a current which increases rapidly at a predetermined speed of said motor.

6. A power system including a source of constant current, a variable speed motor comprising an armature associated with a pair of primary brushes and a pair of secondary brushes displaced therefrom, and a pair of stator windings displaced from each other, dynamoelectric means for energizing each of said stator windings, each dynamoelectric means including a control winding connected in series with said primary brushes, a second control winding connected across said secondary brushes, a third control winding adapted to be independently energized, a fourth control winding, and dynamoelectric means in circuit with said fourth control winding and operative to supply a variable current increasing rapidly at a predetermined speed of said motor.

JOSEPH MAXIMUS PESTARINI.

REFERENCES CITED

The following references are of record in the file of this patent:

UNITED STATES PATENTS

| Number | Name | Date |
| --- | --- | --- |
| 1,945,447 | Pestarini | Jan. 30, 1934 |
| 2,270,708 | Merrill | Jan. 20, 1942 |

FOREIGN PATENTS

| Number | Country | Date |
| --- | --- | --- |
| 680,463 | Germany | Sept. 1, 1939 |